United States Patent
Naaber et al.

(10) Patent No.: US 11,059,709 B2
(45) Date of Patent: Jul. 13, 2021

(54) SEGMENTED TELESCOPICALLY ADJUSTABLE CAP PASSAGE

(71) Applicant: KHS GmbH, Dortmund (DE)

(72) Inventors: Matthias Naaber, Bretzenheim (DE); Bernd Bruch, Weinsheim (DE)

(73) Assignee: KHS GmbH, Dortmund (DE)

( * ) Notice: Subject to any disclaimer, the term of this patent is extended or adjusted under 35 U.S.C. 154(b) by 338 days.

(21) Appl. No.: 16/322,265

(22) PCT Filed: May 30, 2017

(86) PCT No.: PCT/EP2017/062991
§ 371 (c)(1),
(2) Date: Jan. 31, 2019

(87) PCT Pub. No.: WO2018/041428
PCT Pub. Date: Mar. 8, 2018

(65) Prior Publication Data
US 2019/0177144 A1    Jun. 13, 2019

(30) Foreign Application Priority Data

Sep. 2, 2016  (DE) .................... 10 2016 116 437.2

(51) Int. Cl.
*B67B 3/06*    (2006.01)
*B65B 7/28*    (2006.01)
*B65G 11/14*   (2006.01)
*B65G 47/12*   (2006.01)

(52) U.S. Cl.
CPC .............. *B67B 3/06* (2013.01); *B65B 7/2807* (2013.01); *B65G 11/143* (2013.01); *B65G 47/12* (2013.01)

(58) Field of Classification Search
None
See application file for complete search history.

(56) References Cited

U.S. PATENT DOCUMENTS

| | | | | |
|---|---|---|---|---|
| 1,417,780 A | * | 5/1922 | Stephens | B65G 11/083 193/2 R |
| 1,434,376 A | * | 11/1922 | Dorman | B67B 3/064 53/310 |
| 1,456,542 A | * | 5/1923 | Engler | B67C 7/00 53/310 |
| 1,863,223 A | * | 6/1932 | Kantor | B67B 3/064 53/310 |

(Continued)

FOREIGN PATENT DOCUMENTS

| DE | 433 699 | | 9/1926 | |
|---|---|---|---|---|
| DE | 433699 C | * | 9/1926 | ............. B67B 3/064 |

(Continued)

*Primary Examiner* — Hemant Desai
*Assistant Examiner* — Tanzim Imam
(74) *Attorney, Agent, or Firm* — Occhiuti & Rohlicek LLP (57) ABSTRACT

A telescopic cap-supply that supplies caps for closing containers includes a cap passage having a length-adjustable section. Adjustment of a length of the length-adjustable section causes the length-adjustable section to transition between an extended state and a collapsed state. First, second, and third segments form the cap passage. Each of these segments is secured to an adjoining segment in such a manner that two adjoining segments are movable relative to each other.

20 Claims, 10 Drawing Sheets

(56) References Cited

U.S. PATENT DOCUMENTS

| | | | | |
|---|---|---|---|---|
| 1,968,071 | A * | 7/1934 | Craine | B65G 69/16 |
| | | | | 414/295 |
| 2,365,240 | A * | 12/1944 | Arnold | B65D 88/74 |
| | | | | 34/218 |
| 2,968,382 | A * | 1/1961 | Oury | B28C 5/4251 |
| | | | | 193/10 |
| 3,107,767 | A * | 10/1963 | Medoff | D05B 3/22 |
| | | | | 193/25 FT |
| 3,168,946 | A * | 2/1965 | Gay | B65G 11/146 |
| | | | | 193/6 |
| 3,438,174 | A * | 4/1969 | Foss | B67B 3/24 |
| | | | | 53/110 |
| 4,066,175 | A * | 1/1978 | Schulte | C10B 31/04 |
| | | | | 414/199 |
| 4,610,344 | A * | 9/1986 | Eastman | B65G 11/146 |
| | | | | 193/15 |
| 5,190,132 | A * | 3/1993 | Stanelle | B65G 69/182 |
| | | | | 193/30 |
| 5,697,408 | A * | 12/1997 | Reeves | B65G 69/181 |
| | | | | 141/256 |
| 9,359,139 | B1 * | 6/2016 | Faulkner | B65G 11/14 |
| 2005/0133342 | A1 * | 6/2005 | Malmberg | B65G 11/146 |
| | | | | 198/596 |
| 2011/0138740 | A1 * | 6/2011 | Evers | B67B 3/003 |
| | | | | 53/167 |
| 2012/0110949 | A1 * | 5/2012 | Roth | B67B 3/06 |
| | | | | 53/285 |

FOREIGN PATENT DOCUMENTS

| | | |
|---|---|---|
| EP | 0 562 810 | 9/1993 |
| WO | WO2011/004102 | 1/2011 |

* cited by examiner

SEGMENTED TELESCOPICALLY ADJUSTABLE CAP PASSAGE

RELATED APPLICATIONS

This is the national stage under 35 USC 371 of international application PCT/EP2017/062991, filed on May 30, 2017, which claims the benefit of the Sep. 2, 2016 priority date of German application number 10 2016 116 437.2, the contents of which are herein incorporated by reference.

FIELD OF INVENTION

The invention relates to container processing, and in particular, to supplying crown corks for closing containers.

BACKGROUND

In the container-processing industry, it is useful to place a crown cork on a container so that the liquid in the container will not be contaminated. This task is carried out automatically by a closing machine.

In order to carry out its function, a closing machine requires a supply of caps. These crown corks must traverse some distance to reach the closing machine.

In many cases, a closing machine is called upon to close containers of different sizes. As a result, the distance that the crown corks must traverse will change.

SUMMARY

The invention provides a cap supply whose length can change easily to accommodate differences in heights of bottles.

In one aspect, the invention features an apparatus that includes a telescopic cap-supply. The telescopic cap-supply includes a cap passage that has a length-adjustable section. The length-adjustable section transitions between a collapsed state and an extended state. At least three segments form this cap passage. Each segment is secured to an adjoining segment in a displaceable manner. In some embodiments, the segments engage each other to form chains with each segment being a link on the chain.

Having a cap passage be formed from segments that can move relative to adjoining segments makes it possible to have a large change in length between a collapsed state and a fully-extended state. It also makes it possible to shorten or lengthen the cap passage itself by simply adding or removing segments. This makes it a simple matter to adjust a cap segment to whatever maximum length might be required in a particular application.

The use of segments to form the cap passage also makes the cap passage flexible so that it can bend easily and form curves in space. Thus, the cap passage can be displaced in directions that are orthogonal to the dimension along which it is extendable. This means that one can tolerate inaccuracies in the relative positions of the machines on either end of the cap passage. In some embodiments, the two machines are a cap sorter, which aligns the caps in the same direction, and a closing device, which puts the caps on bottles.

The cap supply includes any apparatus that conveys caps in a row, one behind the other, whether passively using gravity or actively using a cap conveyor. In some embodiments, upstream caps push downstream caps along in a movement direction.

The cap supply can transport any type of cap. Although the figures show a crown cork, the caps can be screw caps or snap caps as well.

The cap passage is formed in a way that suppresses the tendency of caps to fall out. Thus, within the cap passage, it is preferable to support the caps along directions other than the direction in which the caps are being conveyed.

In some embodiments, the cap passage is configured to permit cap rotation only along the cap's circumference but not in the other two spatial dimensions. This avoids losing the benefit of the sorting machine and having caps that may be facing the wrong way when it is time to apply them to a container.

In some embodiments, the segments form the cap passage. In such embodiments, a pair of adjoining or adjacent segments forms a section of the cap passage.

The segments can be made from a variety of materials. However, it is easier to reliably reproduce their geometry by making them from injection-molded plastic.

A telescopic cap-supply is one that is adjustable in length along at least one spatial direction with no conversion being needed and without the cap supply's function being restricted or impaired. In the embodiments described herein, it is not necessary that the entire cap passage be length-adjustable. It is possible to have only a limited section be length-adjustable. However, it is particularly useful to have the entire cap passage be length-adjustable. The telescopic cap-supply is also movable in other spatial directions and is in fact flexible so that different portions can move in different spatial directions or combinations thereof by different amounts.

A cap passage or a section of a cap passage is regarded as length-adjustable when its length can be varied as desired between a fully-extended state and a collapsed state with any length between a fully-extended state and the collapsed state being permitted. The adjustability is continuous and thus excludes the case in which length is discrete or quantized and in which case only a finite number of lengths are permitted. Length adjustability is passive, so that altering the length requires an external force in the appropriate spatial directions.

There is no requirement that all portions of an adjustable-length section change by the same amount. Alternatively, there is no requirement that the gaps between each pair of segments be equal at any given length.

For example, in some embodiments, lengthening a cap passage that is in its collapsed state is achieved by moving a topmost segment as far as possible from the segment beneath it before changing the distance between other segment pairs. Thus, the two segments at the top of the section would form a gap between them whereas no gaps would be present between other pairs of segments.

If the cap passage needs to become longer, the next pair of segments is pulled into play. If, after having been extended by the maximum amount, the next pair of segments proves to be inadequate at providing the required length, then a third pair of segments is pulled apart. Thus, in this scheme, for any given length, there exists only one segment that is neither fully-extended nor fully collapsed.

The order in which the lengthening occurs can be varied. In the embodiment described above, the lengthening begins at the top by increasing the gap between the top two segments. But it could just as easily have begun at the bottom or anyplace in between. No matter where it is begun, the same property emerges: that at most one pair of segments is between being fully extended and fully collapsed.

The fully-extended state is a state in which a gap between any two segments is at its maximum value. Conversely, the collapsed state is one in which the gaps between all pairs of segments is at a minimum. In many cases, this corresponds to a gap of zero, which means that the segments contact each other.

The cap passage requires at least three segments. However, embodiments include any number of segments. For example, in some embodiments, the cap passage has five segments. In others, it has ten segments. In others, it has fifteen segments.

As used herein, segments are "adjoining" when they are arranged immediately next to each other with no intervening segment or when they form an uninterrupted portion of the cap passage. In some embodiments, all the segments are arranged in a chain with one segment behind another segment. In some of these embodiments, the segments are laid out in the direction of length adjustability. In other embodiments, the segments are laid out in the caps' transport direction. In yet other embodiments, the segments are laid out one behind the other in both the caps' transport direction and in the direction of length adjustability.

As used herein, "displaceable positioning" of segments in relation to each other refers to the possibility of having a maximum and minimum distance between adjoining segments be determined in some way by the shapes of the segments. In many embodiments, this results from having adjoining segments slide relative to each other.

In some embodiments, the segments are suspended from each other during the extended state. In others, the segments rest on each other in the collapsed state. Other embodiments combine both of the foregoing attributes. These attributes, whether alone or in combination, make it easy to adjust the cap passage's length. It should be noted that although it is technically the length of the adjustable-length section that is being adjusted, since the adjustable-length section is part of the cap passage, adjusting the length of the adjustable-length section is no different from adjusting the length of the cap passage.

In some embodiments, suspension or face-to-face positioning occurs as a result of an upper side and a lower side of each segment moving in a direction of movement of the cap in the cap passage or in a direction of length adjustability along the cap passage.

In some embodiments, each segment comprises an upper connection-element and a lower connection-element. The upper and lower connection-elements participate in the arrangement of segments relative to each other, in the suspension of segments from each other, in positioning faces of segments relative to each other, and in all combinations thereof.

It is particularly useful when these connection elements form a longitudinally displaceable chain.

In some embodiments, the upper and lower connection-elements are configured so as to correspond to one another. As a result, an upper connection-element of one segment interacts with a lower connection-element of an adjoining segment in such a way that both segments move in relation to one another and in such a way that a segment suspends all segments below it. Among these embodiments are those in which the upper and lower connection-elements are the sole way to connect segments to each other.

In some embodiments, the upper connection-element of a segment comprises an upper contact-surface that faces the segment located beneath it. In other embodiments, the lower connection-element of a segment comprises a lower contact-surface that faces the segment located above it. In yet other embodiments, both of these conditions are met. As a result, it is possible for two adjoining segments to be suspended from one another during an extended state by contact of both contact surfaces in a particularly simple and controlled manner.

In other embodiments, the contact surfaces of two adjoining segments that face each other, when in the extended state, are, at least in sections, in contact with one another.

In some of these embodiments, both segments are suspended in relation to one another at the contact surfaces while in the region of the face surfaces there is no contact between the segments. In some embodiments, only the contact surfaces participate in suspending the segments in when they are in an extended state.

In other embodiments, either the upper connection-element or a segment's guide element includes an upper contact-surface that faces a segment immediately above it. In other embodiments, either the lower connection element or the segment's guide comprises a lower contact-surface that faces a segment immediately below it. As a result, it is possible for two adjoining segments to adjoint each other in a particular simply and controlled way when the cap passage is in the collapsed state simply by contact of the foregoing contact surfaces.

In some embodiments, the conjoined or collapsed state features contact surfaces in direct contact with each other but with no actual contact between the segments other than at the contact faces. As used herein, "upper contact-surface" refers to a surface that is arranged at the upper connection-element or in an upper region of the segment. Similarly, the "lower contact-surface" is one that is arranged at a lower connection-element. "Upper" and "lower" in this context are with reference to upstream and downstream directions of the flow of caps through the cap passage. Thus, a first point is said to be "upstream" of a second point if a cap arrives at the first point before arriving at the second point. A first point is said to be "downstream" of a second point if it is not "upstream."

In some embodiments, the upper contact-surface and the lower contact-surface are arranged on opposite sides of the upper connection-element and the lower connection-element respectively. Among those are embodiments in which the upper and lower contact-surfaces are parallel to each other.

Some embodiments feature a contact surface that includes a hook formed at a segment. Such a hook engages a corresponding guide slot of another segment, which is typically the segment located below the segment that has the hook. In such embodiments, the hook typically extends in the direction of the segment that has the guide slot with which the hook is intended to engage. In some embodiments, each segment has, on either two opposing sides thereof or an outer side that faces a way from a passage, either a hook or a slot that is configured to engage a hook.

In some embodiments, each segment includes a guide section that engages different sides of a cap and thus provides multi-sided guidance of a cap through the cap passage. In such embodiments, the guide sections form the cap passage or at least part of the guide passage. In other embodiments, the cap passage is formed in sections. In yet other embodiments, the cap passage is formed through cooperation of a carrying structure such that the guide sections enclose sides of the cap passage and the carrying structure encloses those sides that the guide sections did not close.

As used herein, "multi-sided guidance" refers to guiding the cap in at least two sides to constrain motion in at least two directions and includes constraining motion in more than two dimensions.

In some embodiments, the multi-sided guidance constrains four of the six possible directions of cap movement. Such guidance need not occur throughout the cap passage but can instead occur along a portion of the cap passage. In either case, the cap can move in the correct direction for cap conveyance but not in a direction perpendicular to that direction.

To achieve the foregoing, it is by no means necessary for the guide section to be in contact at all times with a cap. In many embodiments, the guide section is configured simply to prevent rotation of the cap or the possibility of several caps sliding past one another within the cap passage.

Some embodiments feature a funnel-shaped guide element so that adjacent guide elements can be stacked one inside the other. In some of these embodiments, the funnel-shaped guide sections collectively enclose the entire perimeter of the cap passage and block all sides that face at right angles to the caps' direction of movement In yet other embodiments, all segments have the same shape and size and are formed from the same material. This makes it easy to economically manufacture the cap supply and to lengthen the cap supply, since all that needs to be done is to add more segments, which would be identical anyway.

In an alternative embodiment, a pair of segments includes segments that match but that have laterally offset contact surfaces, where the offset is perpendicular to the direction of the caps' progression along the cap passage. In these embodiments, a bolt on one segment engages a bolt channel of the adjacent segment so that the two segments can move relative to each other along the direction in which the length is to be adjusted. Among these are embodiments in which the bolt's end has a diameter greater than that of the bolt channel. Also among these are embodiments in which a component arranged at the end of the bolt has a diameter greater than that of the bolt channel. In either case, the contact surface is formed by whichever region has the greater diameter. In such embodiments, each segment includes, on either side thereof, a bolt and a bolt-receiving channel with both bolts and both receiving-channels being aligned along the direction in which the cap passage's length is to be adjusted.

In some embodiments, the segments are formed as one single unitary piece. This permits simple manufacture. For example, the segment can be molded from plastic via an injection molding process. In other embodiments, the segment is formed by securing parts to each other, for example by using adhesives.

Some embodiments feature multi-part segments in which two connection elements are arranged with an adjoining segment. In some of these embodiments, the segment has three parts: a first part, which is a guide section with contact surfaces, and second and third parts that also have contact surfaces and face surfaces. Among these are embodiments in which the second and third parts are identical. Examples of second and third parts include a holding eye and a holding tab respectively. In another embodiment, the cap passage, or at least sections thereof, remains open in a direction perpendicular to the direction along which caps move through the cap passage. In these embodiments, there exist gaps in the guide sections of adjacent segments with the gaps being so small that a cap cannot pass through them.

In another embodiment, the cap passage, when in the extended state, is open in sections along a direction that is perpendicular to the movement direction of caps through the passage. The opening, however, is too small for any caps to fall out. Thus, the gap is always smaller than the cap's diameter or the width of the cap passage. Particular embodiments include those in which the gap is about 10% of the cap's diameter. In other embodiments, the gap is 20% of the cap's diameter. In yet other embodiments, the gap is 50% of the cap's diameter.

In an alternative embodiment, the cap passage is not enclosed over the entire perimeter but may instead have an opening along the perimeter that is smaller than the cap's diameter.

In yet other embodiments, the cap passage remains partially open in all states as a result of a gap or an opening.

In other embodiments, the segments enclose the cap passage's entire perimeter, at least in the collapsed state. This promotes more secure and reliable guidance of the caps as they may their way to the closure device. Among these embodiments are those in which the segments achieve this complete enclosure on their own. In other embodiments, the guide sections achieve this complete enclosure. The complete enclosure of the cap passage can extend over part of the cap passage's length or over its entire length. In other embodiments, structures other than just the segments participate in complete enclosure. Among these are embodiments in which a carrier structure participates in the enclosure.

Some embodiments feature segments that have been arranged such that two adjoining segments cooperate in guiding the cap. This feature can extent throughout the cap passage or only in a limited section thereof. In these embodiments, each segment's dimension along the cap's movement direction is less than the cap's diameter. In others, each segment's dimension along the cap's movement direction is less than the cap passage's width.

In alternative embodiments, the segments are such that a single segment by itself guides the cap along a section of the cap passage. These include embodiments in which it is the segment's guide section that participates in such guiding. In these embodiments, the segment, and in particular, its guide section, has a dimension along the cap's direction of movement that is not smaller than the cap's diameter. In others of these embodiment, this same dimension of either the segment or its guide section is not smaller than cap passage's width. Among these embodiments are this dimension is no greater than five times the cap's diameter. In other embodiments, this dimension is no greater than three-halves times the cap's diameter.

Some embodiments feature a carrying structure that extends at least only the cap passage's length-adjustable part, although there exist embodiments in which it extends along the cap passage's entire length. In these embodiments, each segment includes a region that permits the carrying structure to engage the segment and guide it. This provides a simple way to reduce play and to reduce any tendency of the segment to move in a direction that is perpendicular to the dimension along which the cap passage's length changes.

The carrying structure itself can take on numerous forms. In some embodiments, it is a single piece. In others, it is formed from two identical single-piece elements. In yet other embodiments, the carrying structure takes the form of one or more rods. In the case of two or more rods, the rods are parallel.

The cross section of the carrying structure can also vary. In the case of a rod, the cross section can be circular. Other carrying structures feature a rectangular cross section when a transverse cut is taken in a plane perpendicular to the cap's direction of motion along the passage.

Certain embodiments of the carrying structure have a cross section that includes a groove or two grooves. In those embodiments with two grooves, the grooves run parallel along opposing sides of the carrying structure. The groove extends along the caps' direction of movement in the cap passage. Although it may extend over only part of the length-adjustable section, in some embodiments, it extends all along the length-adjustable section.

In those embodiments that have a carrying structure, it is useful for each segment to have something that engages or receives the carrying structure. This generally takes the form of an opening that receives or engages a carrying structure. In the case of rod-shaped carrying structure, the opening is formed by a cuff or, where two such rods are present, a pair of cuffs. Other embodiments feature a circular receiver that receives a rod-shaped carrying structure.

In those embodiments in which the carrying structure has one or more grooves, it is useful for each segment to have a structure that engages the groove on either one or both sides, thereby enabling the groove to guide the segment.

In those embodiments that feature one or more rods as a carrying structure, such as those that have a pair of parallel rods as the carrying structure, each segment features a latch opening or a cuff that that surrounds at least a portion of each rod's circumference. In some embodiments, the latch opening or cuff spans an angular range of between 185° and 300°. In other embodiments, the latch opening or cuff spans an angular range of between 190° and 270°. In yet others, the latch opening or cuff spans an angular range of between 220° and 230°

In some embodiments, the individual segments are arranged such that one segment is on one side of the carrying structure and an adjacent segment is on the other side of the carrying structure. Among these are embodiments in which the segments are arranged in this alternating fashion along a pair of parallel structures that together form the carrying structure. In these embodiments, the segments alternate sides along the height of the can passage.

Other embodiments are those in which a pair of opposing segments forms at least a portion of the cap passage. Among these are embodiments in which a first segment forms the cap passage's front side and a second segment forms the cap passage's rear side. The lateral sides of the cap passage would then be formed by the sides of one or both of the first and second segment.

In other embodiments, a pair of non-opposing segments forms at least a portion of the cap passage. In these embodiments, both segments in the pair are arranged in an identical manner. Among these are embodiments in which a first segment forms the cap passage's front side and a second segment forms the cap passage's rear side. The lateral sides of the cap passage would then be formed by the sides of one or both of the first and second segment. Among the foregoing embodiments are those in which one segment is above the other and arranged to be movable relative to each other or to contact each other. In some of these embodiments, the segments are on opposite sides of a carrying structure. In those embodiments that feature two carrying structures, the segments are opposite sides of both carrying structures such that one segment is on a first side of the carrying structure and the second segment is on the side of the carrying structure that is opposite the first side.

In yet other embodiments, a carrying structure has a first side and a second side that is opposite the first side. In these embodiments the segments are arranged so that some are on the first side and others are on the second side. The segments are arranged such that they extend, one on top of the other, along the caps' movement direction. In some embodiments, the segments are either offset into one another so that one can be nestled inside or at least partially fit inside the other, for example in the same way that two funnels or cones can be stacked. In such cases, two segments that are opposite each other cooperate to guide a cap's passage at the same time. In some cases, at least three segments cooperate in this manner.

In some embodiments, there exists a cap-supply channel at one end at the end of the cap passage and preferably at a lower end thereof. This cap-supply channel has a ninety-degree bend.

In some embodiments, a fixing element connects to an upper end of the cap passage. In other embodiments, a receiver for securing the cap supply to a cap-sorting device connects to an upper end of the cap passage. Other embodiments feature a distribution head at the upper end of the cap passage.

These and other features of the invention will be apparent from the following detailed description and the accompanying figures, in which:

BRIEF DESCRIPTION OF THE DRAWINGS

FIG. 2d is a perspective view of the collapsed cap passage shown in FIG. 2b;

FIG. 2e is a perspective view of the extended cap passage shown in FIG. 2a;

FIG. 4d is a perspective view of the third embodiment the cap passage when it is in its extended state;

DETAILED DESCRIPTION

Figure 1A:
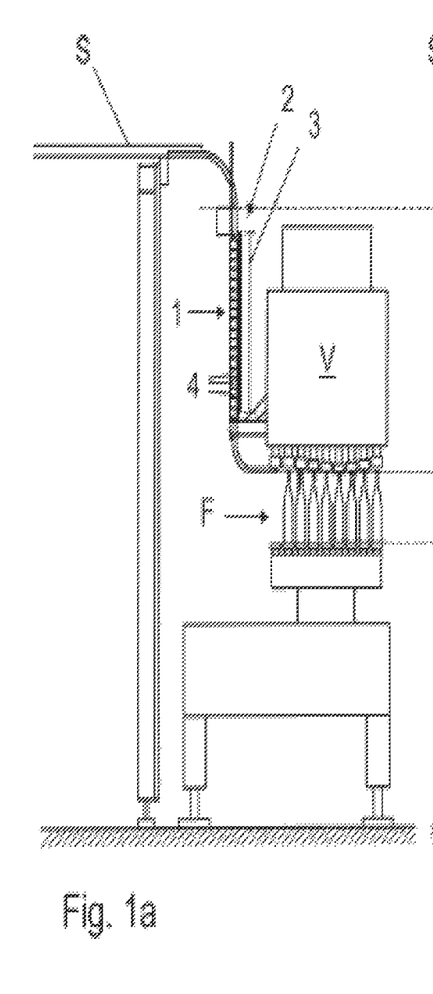
FIGS. 1a and 1b show the collapsed and extended states of a telescopic cap-supply at a closing device with a cap passage.

In FIG. 1*a*, a sorting device S brings crown corks K to a closure device V that has been positioned for closing bottles G. The closure device V then closes bottles F with these crown corks K.

A telescopic cap-supply 1 connects the sorting device S to the closure device V. The cap supply 1 forms a cap passage 2 that extends along a running direction to a closure device V. The cap supply 1 includes a length-adjustable section 3. When at its shortest length, the length-adjustable section 3 defines the cap supply's "collapsed state." At any other length, the length-adjustable section 3 defines the cap supply's "extended state."

A typical embodiment includes a housing, and in particular, a hygienic housing. In such embodiments, the housing encloses the closure device V. However, the sorting device S remains outside the housing at some fixed height.

The cap passage 2 passes through or over this housing. In some embodiments, there exists a lock arrangement at an inlet that goes into the hygienic housing of the closure device V. In other arrangements, there exists a lock arrangement at an inlet that goes into a cap-treatment device that cleans and sterilizes caps.

Figure 1B:
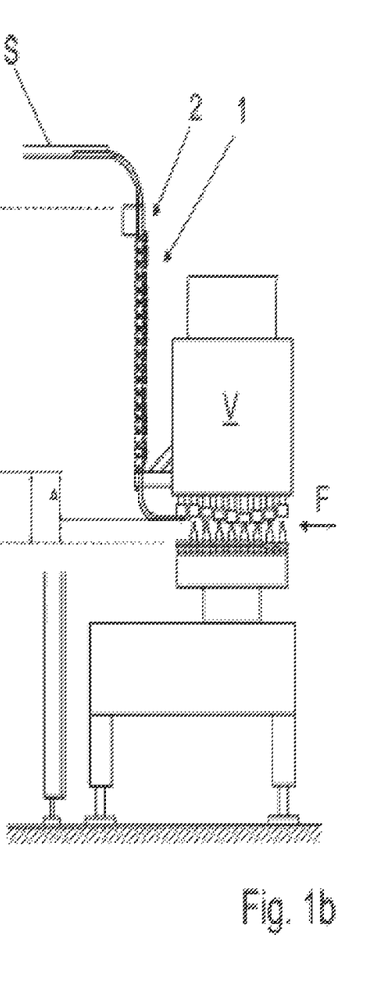

In FIG. 1*a*, the bottles F are large. Thus, the closure device V is relatively close to the sorting device S. In FIG. 1*b*, the bottles F are smaller. Thus, the closure device V is lower and therefore further from the sorting device S. The length-adjustable section 3 permits the cap passage 2 to transition between different lengths, as shown in FIG. 1*a* and in FIG. 1*b*.

Figure 2A:
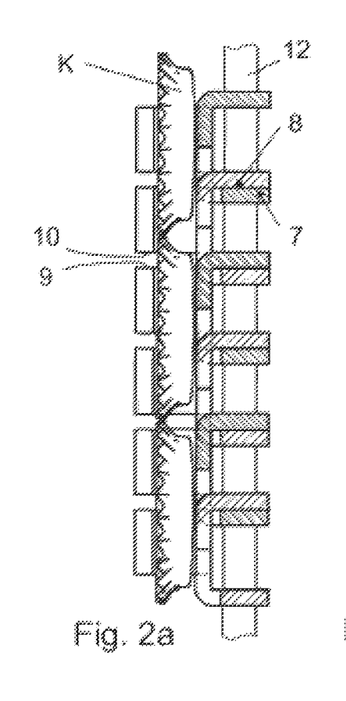
FIGS. 2a and 2b are sectional views of the cap passage if FIGS. 1a and 1b in its extended and collapsed states respectively.
Figure 2B:
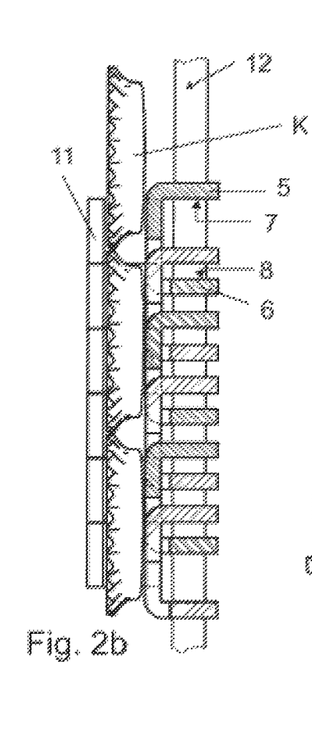
Figure 2C:
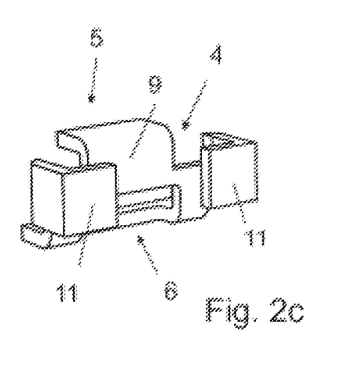
FIG. 2c is a perspective view of one of the segments from the cap passage of FIGS. 2a and 2b.

The cap passage 2, and in particular, the length-adjustable section 3 thereof, is made of individual segments 4. FIG. 2*c* shows one of these segments 4. Each segment 4 adjoins other segments 4 at a metal carrying structure 12 as shown in FIGS. 2*a* and 2*b*. The segments 4 are movable relative to each other. This ability to move relative to each other permits the length of the length-adjustable section 3 to be adjusted, as seen in FIG. 2*a*, and the collapsed state, as seen in FIG. 2*b*.

Each segment 4 includes a guide section 11. As is apparent from FIGS. 2*d* and 2*e*, the guide sections 11 cooperate to form the cap passage 2. In the particular embodiment shown, the cap passage 2 is partially opened on one side along its entire length in both its fully-extended state, shown in FIG. 2*e*, and in its collapsed state, shown in FIG. 2*d*. The guide section 11 surrounds a crown cork K on three sides and includes projections that project over the crown cork K on a fourth side.

Referring now to FIG. 2*c*, each segment 4 includes an upper connection-element 5 and a lower connection-element 6. As can be seen in FIG. 2*b*, the upper connection-element 5 has an upper contact-surface 7 and the lower connection-element 6 has a lower contact-surface 8.

Figures 2D, 2E:
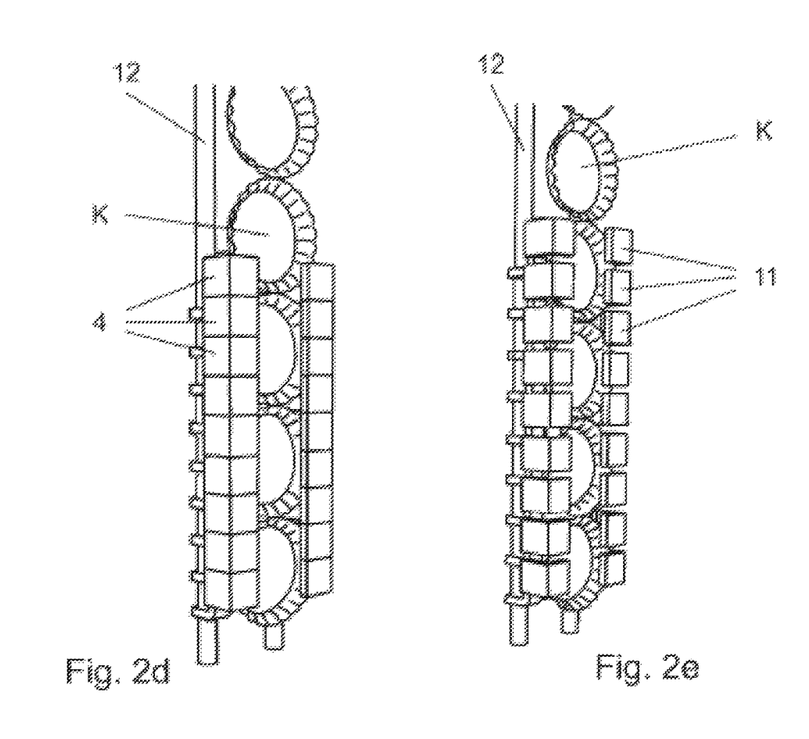

In the extended state, which is shown in FIG. 2*a* and FIG. 2*e*, adjoining segments 4 contact each other only at the upper and lower contact-surfaces 7, 8. More specifically, the lower contact-surface 8 of one segment contacts the upper contact-surface 7 of an adjoining segment. As a result, the upper connection-element 5 and the lower connection-element 6 cooperate to form a chain of suspended segments 4.

FIG. 2*b* and FIG. 2*d* show the cap passage 2 in its collapsed state. In this collapsed state, adjoining segments 4 abut each other. Contact between adjoining segments 4 only occurs in the region of an upper and lower face 9, 10 arranged at upper and lower edges of the guide section 11. This closes the side of the cap passage 2. As a result, the cap passage 2 is laterally enclosed in its collapsed state. This differs from the expanded state in FIGS. 2*a* and 2*e*, in which a space that separates each pair of segments 4 from each other forms gaps in the cap passage 2.

Figure 3A:
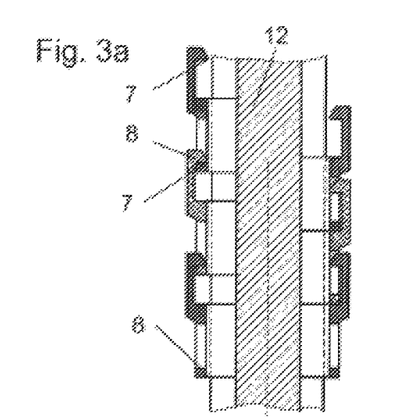
FIG. 3a is a sectional view of a second embodiment of a cap passage.
Figure 3B:
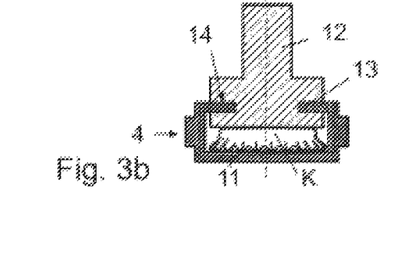
FIG. 3b shows view of the cap passage of FIG. 3a looking down in the running direction.
Figure 3C:
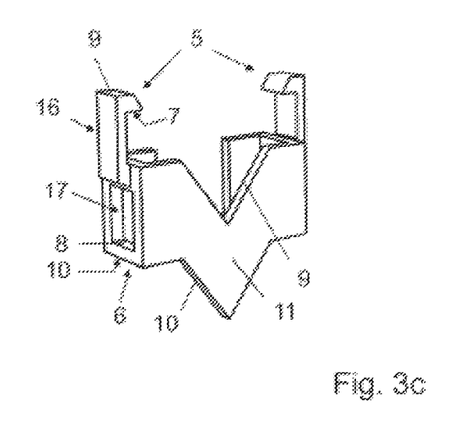
FIG. 3c shows a segment used in the cap passage of FIGS. 3a and 3b.

FIG. 3*a* shows a second embodiment of a cap passage 2 having identical segments 4, an exemplary one of which can be seen in FIG. 3*c*. In this second embodiment, a hook 16 implements the upper connection-element 5 and a guide slot 17 implements the lower connection-element 6. The guide slot 17 receives the hook 16 of an adjoining segment 4 in such a way that the hook 16 has enough play to move freely up and down in the guide slot 17 in which it finds itself received, at least as far as the extent of the guide slot 17.

The hook 16 has a surface that faces an adjoining segment 4 that lies below the segment 4. This surface forms the upper contact-surface 7. The guide slot 17 has a surface that faces an adjoining segment that lies above the segment 4. This surface forms the lower contact-surface 8. The upper and lower edges of the guide section 11 thus form the upper and lower contact-surfaces 8, 7 to define a region that is enclosed on three sides.

In the particular embodiment shown, the carrying structure 13 has a T-shaped cross-section, as shown in FIG. 3*b*. Also visible in FIG. 3*b* is a groove 14 that extends along the length of the carrying section 12 in the running direction. This groove 14 forms a guide region 13. As shown in FIG. 3*b*, the segment 4 forms a back side and two lateral sides or the cap passage 2 while the carrying section 12 forms the front side of the cap passage 2.

Figure 3D:
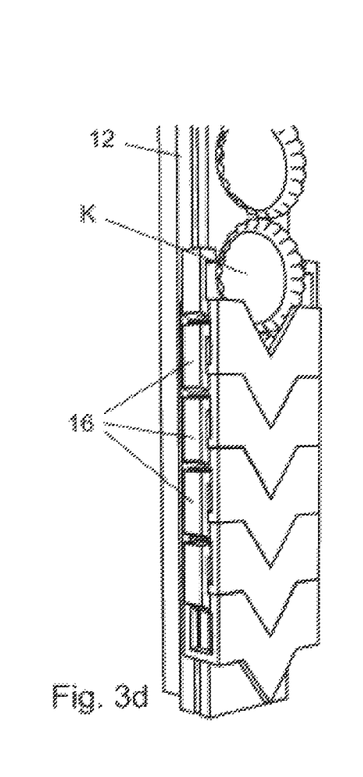
FIG. 3d is a perspective view of the cap passage of FIG. 3a in the collapsed state.

In the collapsed state, the carrying structure 12 cooperates with the segments 4 to surround the cap passage 2 on all sides over its entire length. The guide section 11 encloses the two lateral sides and the back side of the cap passage 2 and the carrying structure 12 completes the enclosure by closing off the front side of the cap passage 2. This fully-surrounded portion of the guide section 11 can be seen in FIG. 3*d*

Figure 3E:
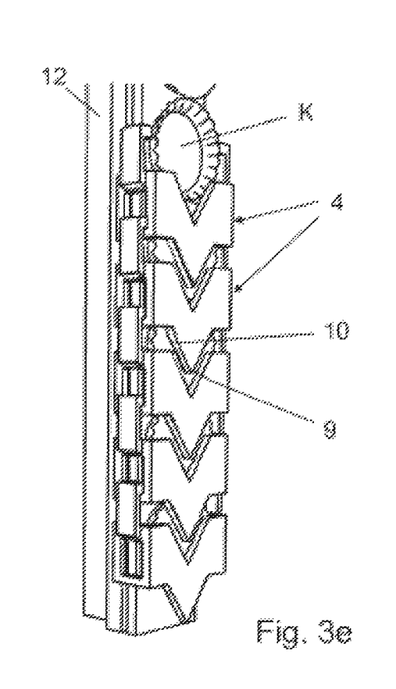
FIG. 3e is a perspective view of the cap passage of FIG. 3a in the extended state.

In contrast, in the extended state, as shown in FIG. 3*e*, each segment 4 uses its hook 16 to hang off the segment 4 above it by having the hook 16 engage the guide slot 17 of that segment. This forms a gap between segments 4.

Figures 4A, 4B, 4C:
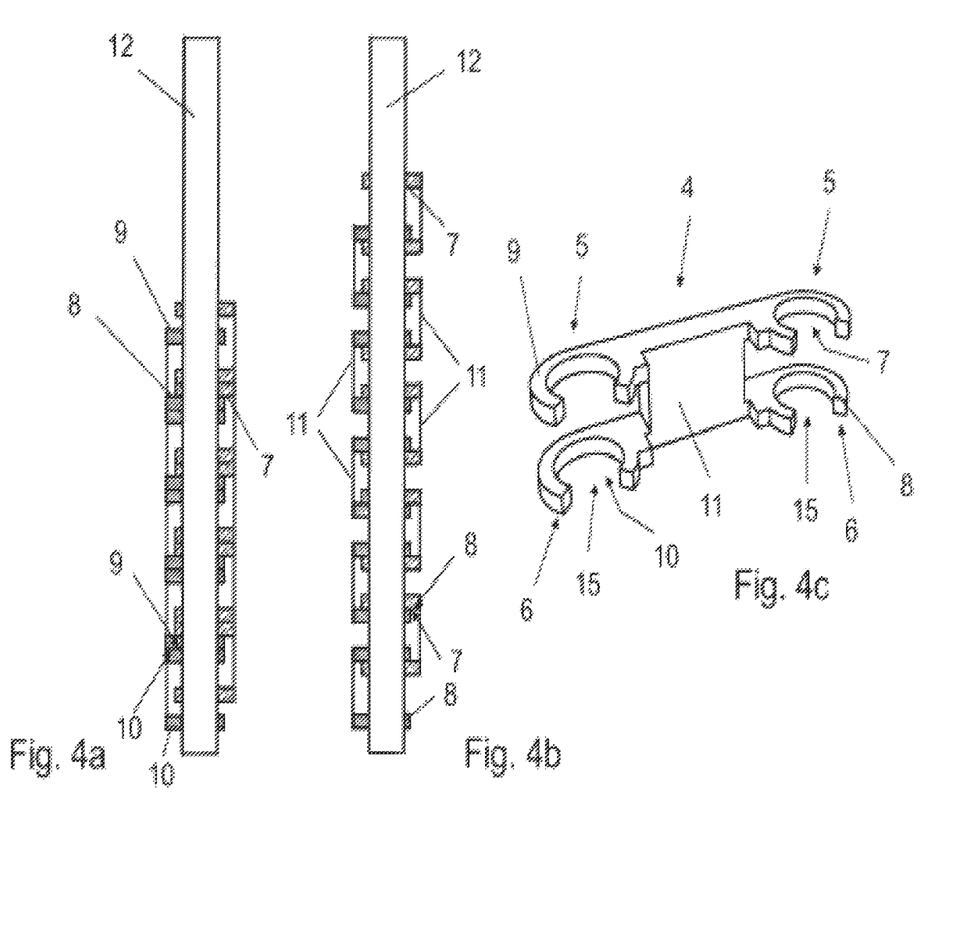
FIG. 4a is a sectional view of a third embodiment of a cap passage, which is in its collapsed state.
FIG. 4b shows the cap passage of FIG. 4a in its extended state.
FIG. 4c is a perspective view of a segment used in the cap passage of FIGS. 4a and 4b.
Figure 4D:
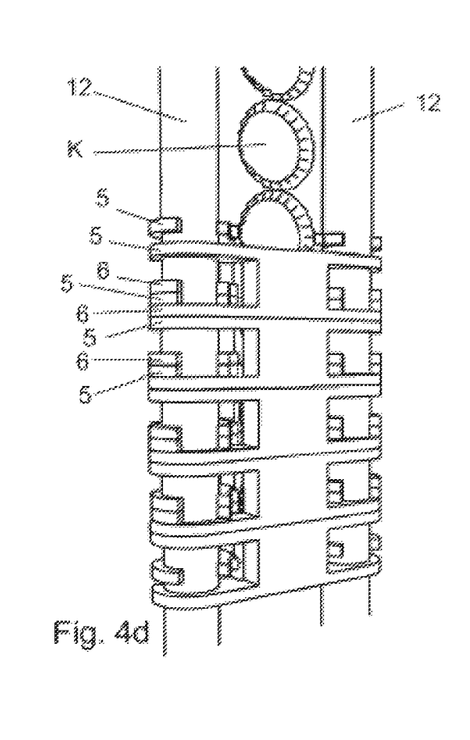
FIG. 4d is a perspective view of the third embodiment the cap passage when it is in its collapsed state.
Figure 4E:
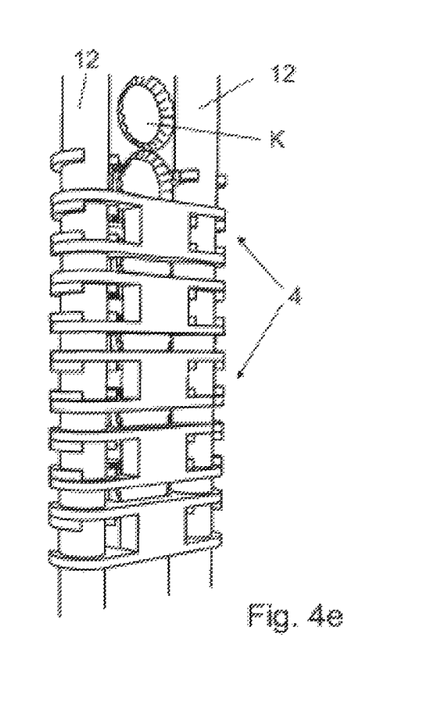
FIG. 4e a perspective view of the embodiment of the cap passage shown in FIG. 4a, in the extended state.

FIGS. 4*a*-4*e* show a cap passage 2 formed from an alternative segment 4. In the alternative segment 4, best seen in FIG. 4*c*, the upper connection-element 5 has cuffs 15 on either side thereof and the lower connection-element 6 also has cuffs 15 on either side thereof. These cuffs 15 align to engage a carrying structure 12 formed by two parallel rods, each having a circular cross-section, as shown in FIGS. 4*d* and 4*e*. In the embodiment shown in FIGS. 4*d* and 4*e*, the cuffs 15 surround each rod by 270 degrees.

In this embodiment, the upper and lower faces 9, 10 of the guide section 11 are on the upper and lower connection-elements 5, 6 respectively. The upper contact-surface 7 and the upper face 9 are on opposite parallel sides of the upper connection-element 5. The lower face 10 and the lower contact-surface 8 are on opposite parallel sides of the lower connection-element 6, as can be seen in FIG. 4*c*.

In the embodiment shown in FIG. 4*a* and FIG. 4*b*, adjacent segments 4 once again form the cap passage 2.

However, adjacent segments 4 lie on opposite sides of the carrying structure 12. Between the upper connection-element 5 and the lower connection-element 6 of a particular segment 4 there lie an upper connection-element 5 of an adjacent segment on the opposite side of the carrying structure 12 and a lower connection-element 5 of an adjacent segment on the opposite side of the carrying structure 12.

In the extended state, a segment 4 contacts only upper and lower contact surfaces 7, 8 of segments on the opposite side of the carrying structure 12. In the collapsed state, each segment 4 lies with its lower face 10 on the upper face 9 of a segment that lies on the same side of the carrying structure 12. In addition, each segment 4 also contacts the upper and lower contact surfaces 7, 8 of adjacent segments on the opposite side of the carrying structure 12.

Figure 5A:
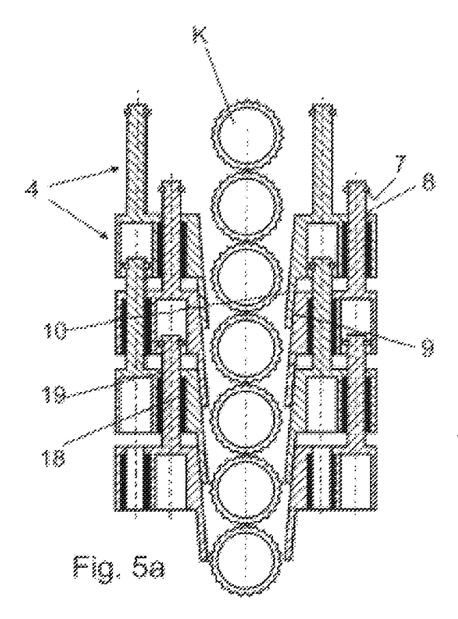
FIG. 5a is a sectional view of a fourth embodiment of a cap passage when it is in its collapsed state.
Figure 5B:
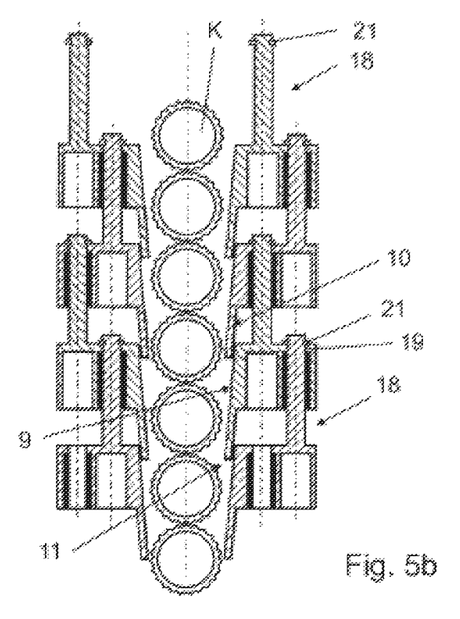
FIG. 5b shows the cap passage of FIG. 5a in its extended state.

FIGS. 5a and 5b show a fourth embodiment in which the segments 4 that form the cap passage 2 are identical to each other but mounted such that each segment is rotated around the axis of the adjustable-length section 3 by 180 degrees relative to its adjacent segments.

Each upper connection-element 5 includes a bolt 18 with a ring 21 arranged at an end thereof. Each lower connection-element 6 has a channel 19 that receives a bolt 18. The bolt 18 and the channel 19 are arranged at different radial distances from the axis. As a result of the rotation, the bolt 18 of a particular upper connection-element 5 will align with the channel 19 of an adjacent segment's channel 19, thus making it possible to for the channel 19 to receive the bolt 18.

The bolt's diameter is less than that of the channel 19. As a result, it is possible to displace the bolt 18 while it is inside the channel 19. The ring 21 at the bolt's end, however, has a diameter larger than that of the channel 19 As a result, the surface of the bolt 18 faces the segment 4 below and forms the upper contact-surface 7. Meanwhile, a circumferential edge of the channel 19 forms the lower contact-surface 8.

As is apparent from FIGS. 5a and 5b, the fourth embodiment's guide sections 11 form a funnel in which segments 4 that adjoin each other push into one another as they engage each other. The lower face 10 of each segment 4 covers up an upper face 9 of an adjacent segment 4 in the course of forming the funnel. This results in a cap passage 2 whose sides remain fully enclosed in both the extended state and in the collapsed state.

FIGS. 6a-6d show a sixth embodiment in which the segments 4 are multi-part segments.

Figure 6A:
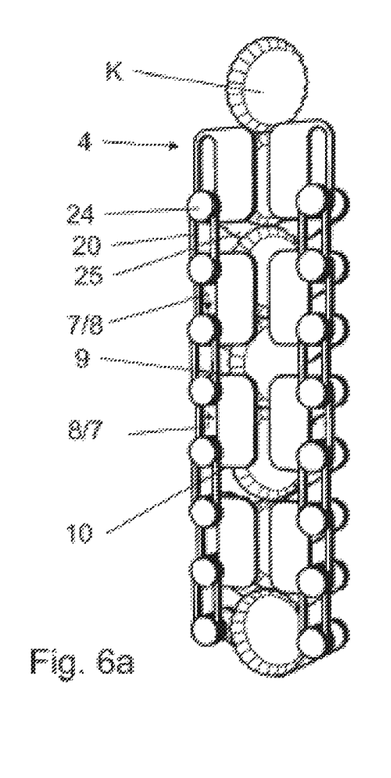
FIG. 6*a* is a perspective view of another embodiment of a can passage in its extended state.
Figure 6B:
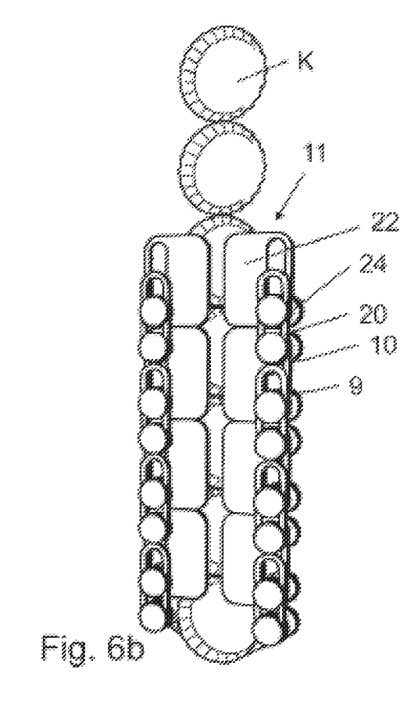
FIG. 6*b* shows the cap passage of FIG. 6*a* in its collapsed state.

In the sixth embodiment, a pair of parallel guide plates 22 on one side of the cap passage 2 form the guide section 11. Each guide plate 22 has a slot 23 that extends along the crown corks' movement direction through the cap passage 2. Each slot 23 accommodates a pair of holding bolts 23 one above the other. The holding bolts 23 are free to move along the length of the slot 23.

Figure 6C:
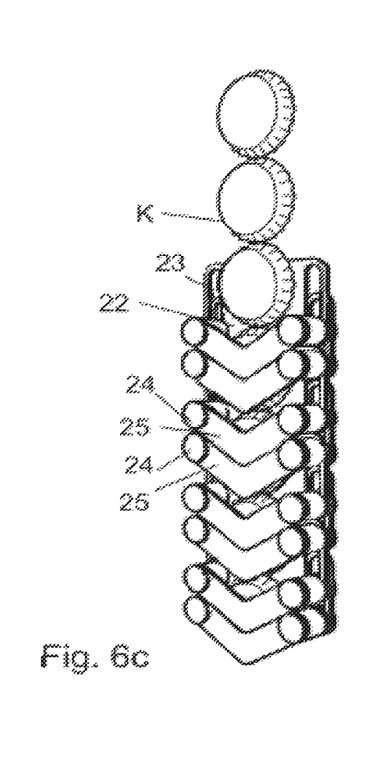
FIG. 6*c* is a perspective view of the other side of the cap passage shown in FIG. 6*a*.
Figure 6D:
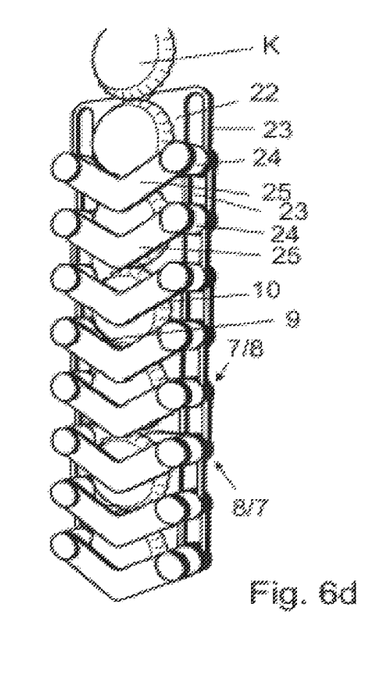
FIG. 6*d* is a perspective view of the other side of the cap passage shown in FIG. 6*b*.

FIGS. 6c and 6d show a view from the side opposite that shown in FIGS. 6a and 6b. From this point-of-view, it is possible to see a guide bar 25 that connects to a holding bolt 24 at each end thereof. Each guide bar 25 thus couples the two guide plates 22 to each other via the two holding bolts 24 that pass through the slots 23 of the two guide plates 22. The guide plates 22 and the guide bars 25 thus form front and rear sides of the cap passage 2. The holding bolts 23 form the lateral sides of the cap passage 2.

To couple adjoining segments 4 to each other, each holding bolt 24 has a holding eye 20 that extends along the movement direction of the crown corks K. A holding eye 20 engages a holding bolt 24 of an adjacent segment 4 and thus couples two adjacent segments 4 together while providing enough play so that adjacent segments 4 can be displaced relative to each other.

In the sixth embodiment, upper edges of the guide plates 22, an upper edge of the holding eye 20, and an upper edge of the guide bar 25 cooperate to form the upper face 9 of the guide section 11. Meanwhile, lower edges of the guide plates 22, an underside of the lower of two holding bolts 24 at a segment 5, and an underside of the guide bar 25 cooperate to form the lower face 10 of the guide section 11.

In the collapsed state, the structures that form the upper face 9 contact the structures that form the lower face 10 of an adjacent segment 4. In the extended state, the individual segments 4 connect only via the holding eyes 20 of adjacent segments 4. In some embodiments, a holding eye 20 is an upper connection-element 5 and the holding bolt 24 that it engages is a lower connection-element 6. The upper contact surface 7 is therefore at the holding eye 20 and the lower contact surface 8 is at the holding bolt 24. In other embodiments, a holding eye 20 is a lower connection-element 6 and the holding bolt 24 that it engages is an upper connection-element 5. In these embodiments, the upper contact surface 7 is at the holding bolt 24 and the lower contact surface 8 is at the holding eye 20.

Having described the invention and a preferred embodiment thereof, what is claimed as new and secured by letters patent is:

The invention claimed is:

1. An apparatus comprising a telescopic cap-supply that supplies caps for closing containers, said telescopic cap-supply comprising a cap passage having a length-adjustable section, wherein adjustment of a length of said length-adjustable section causes said length-adjustable section to transition between an extended state and a collapsed state, wherein first, second, and third segments form said cap passage, and wherein each of said segments is secured to an adjoining segment in such a way that two adjoining segments are movable relative to each other.

2. The apparatus of claim 1, wherein, in said extended state, said first segment suspends said second segment and said second segment suspends said third segment and wherein, in said collapsed state, said first segment rests on said second segment and said second segment rests on said third segment.

3. The apparatus of claim 1, wherein said second segment comprises an upper connection-element that enables said second segment to engage said first segment and wherein said second segment comprises a lower connection-element for enabling said second segment to engage said third segment.

4. The apparatus of claim 3, wherein said second segment's upper connection-element comprises an upper contact-surface that faces said third segment and said second segment's lower connection-element comprises a lower contact-surface that faces said first segment.

5. The apparatus of claim 3, wherein said upper connection-element comprises an upper face surface that faces said first segment and wherein said lower connection-element comprises a lower face surface that faces said third segment.

6. The apparatus of claim 1, wherein each of said segments comprises a guide section that guides plural sides of a cap and wherein said guide sections of said segments collectively form said cap passage.

7. The apparatus of claim 6, wherein said guide section of said second segment comprises an upper face surface that faces said first segment and a lower face surface that faces said third segment.

8. The apparatus of claim 1, wherein said segments comprise first and second adjoining segments, each of which has a contact surface and wherein, in said extended state, said contact surfaces face each other and face surfaces of said adjoining segments do not contact each other.

9. The apparatus of claim 1, wherein said segments comprise first and second adjoining segments, each of which has a contact surface and wherein, in said collapsed state, said contact surfaces face one another while said adjoining segments do not contact each other.

10. The apparatus of claim 1, wherein said first segment and said second segment have an identical shape and wherein said second segment and said third segment have an identical shape.

11. The apparatus of claim 1, wherein each of the segments is formed as a multi-part segment, each of which comprises two connection elements for engagement with an adjoining segment.

12. The apparatus of claim 1, wherein, in said extended state, said cap passage has an opening that faces a direction that is perpendicular to a direction in which said caps move when traversing said cap passage.

13. The apparatus of claim 1, wherein, when transitioning into said collapsed state from said extended state, said cap passage encloses four sides of said caps therein and wherein when transitioning into said extended state from said collapsed state, openings are formed to expose said caps.

14. The apparatus of claim 1, wherein, in each state of said length-adjustable section, said segments are arranged to guide each cap through said cap passage continuously through at least two adjoining segments, wherein each cap has a diameter and wherein each segment extends along said cap passage by less than half of the diameter of each cap.

15. The apparatus of claim 1, further comprising a carrying structure that extends at least along said length-adjustable section, wherein each segment comprises a guide region shaped for cooperating with said carrying structure to guide said caps.

16. The apparatus of claim 1, further comprising a cap-cleaning machine, wherein at least a portion of said length-adjustable section is a constituent of said cap-cleaning machine and wherein each segment is a multi-part segment that comprises three parts, one of which forms a guide section and another of which is a holding tab.

17. The apparatus of claim 1, wherein, in said extended state, gaps form in said cap passage as a result of spaces that separate pairs of the segments from each other.

18. The apparatus of claim 1, wherein each of the segments comprise funnel-shaped guide elements that are pushed into engagement with one another to guide plural sides of each cap and to collectively form said cap passage.

19. The apparatus of claim 1, wherein, in each state of said length-adjustable section, said segments are arranged to guide each cap through said cap passage continuously through at least two adjoining segments, wherein said cap passage has a width and wherein each segment extends in a direction of movement of each cap through said cap passage by less than said width.

20. The apparatus of claim 1, wherein each segment is a multi-part segment that comprises three parts, one of which forms a guide section and another of which is a holding eye.

* * * * *